United States Patent
Hemphill et al.

(10) Patent No.: US 9,725,027 B2
(45) Date of Patent: Aug. 8, 2017

(54) E-TRACK TIE DOWN SYSTEM FOR A VEHICLE CARGO BED

(71) Applicant: FORD GLOBAL TECHNOLOGIES, LLC, Dearborn, MI (US)

(72) Inventors: Joshua Robert Hemphill, White Lake, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 14/978,762

(22) Filed: Dec. 22, 2015

(65) Prior Publication Data
US 2017/0174119 A1    Jun. 22, 2017

(51) Int. Cl.
*B60P 7/08* (2006.01)
(52) U.S. Cl.
CPC ................... *B60P 7/0815* (2013.01)
(58) Field of Classification Search
CPC .................................................. B60P 7/0815
USPC ..... 410/8–12, 102, 104, 105, 106, 108, 110, 410/113–116
See application file for complete search history.

(56) References Cited

U.S. PATENT DOCUMENTS

| 5,533,848 | A  | * | 7/1996  | Davis   | B60P 7/0815 |
|           |    |   |         |         | 410/104     |
| 6,971,828 | B2 |   | 12/2005 | Bernardo |            |
| 7,549,828 | B2 | * | 6/2009  | Smith   | B60P 7/0807 |
|           |    |   |         |         | 410/106     |
| 7,900,990 | B2 |   | 3/2011  | Townson |             |
| 8,657,542 | B2 |   | 2/2014  | Liu et al. |          |
| 8,690,502 | B1 | * | 4/2014  | Huang   | B60P 7/0807 |
|           |    |   |         |         | 410/101     |

OTHER PUBLICATIONS

Invis-A-Rack Cargo Management System, Heavy Duty Bed Rail Clamps, www.deezee.com, 1 page.

* cited by examiner

*Primary Examiner* — Stephen Gordon
(74) *Attorney, Agent, or Firm* — Jason Rogers; Brooks Kushman P.C.

(57) ABSTRACT

A vehicle includes a truck bed side panel, a docking plate, an E-track, and a clamp. The truck bed side panel has a top surface, a side surface, and an overhang extending from the top surface. The docking plate is secured to the side surface and defines a keyway. A keyed protuberance extends from the E-track. The keyed protuberance engages the keyway and secures the E-track to the docking plate. The clamp extends from the E-track and engages the overhang to secure the E-track to the side panel.

14 Claims, 4 Drawing Sheets

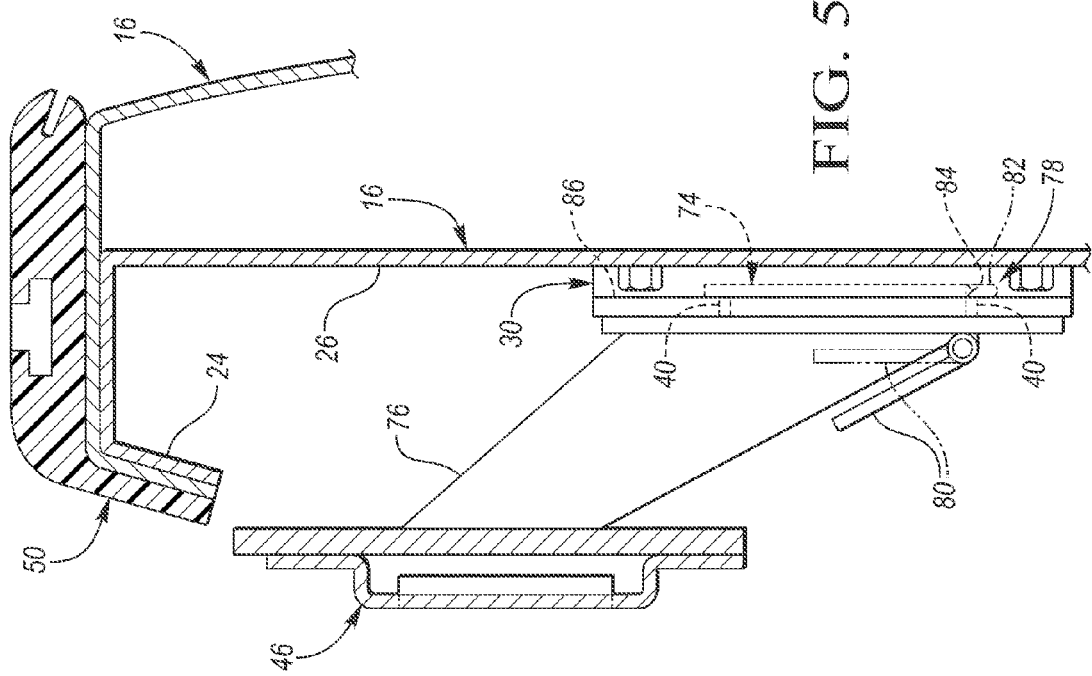
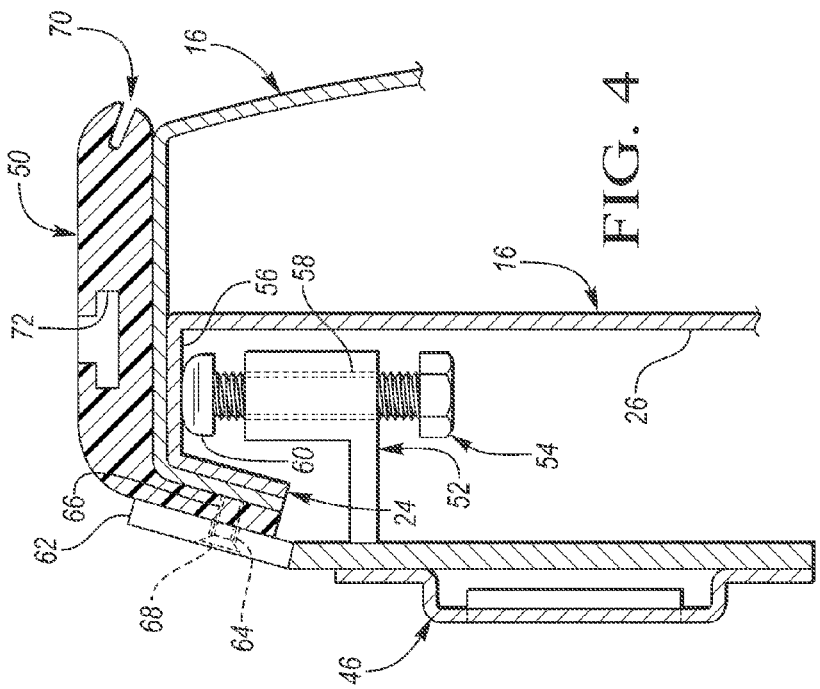

E-TRACK TIE DOWN SYSTEM FOR A VEHICLE CARGO BED

TECHNICAL FIELD

The present disclosure relates to tie systems configured to secure loads being transported within pickup truck beds.

BACKGROUND

In order to prevent loads from shifting or falling out of a truck bed during transportation, tie down systems may be utilized to secure a load that is being transported within the truck bed.

SUMMARY

A vehicle includes a truck bed side panel, a docking plate, an E-track, and a clamp. The truck bed side panel has a top surface, a side surface, and an overhang extending from the top surface. The docking plate is secured to the side surface and defines a keyway. A keyed protuberance extends from the E-track. The keyed protuberance engages the keyway and secures the E-track to the docking plate. The clamp extends from the E-track and engages the overhang to secure the E-track to the side panel.

An E-track system includes a longitudinally extending track, a keyed protuberance, and a clamp. The longitudinally extending track defines an array of slots that are configured to receive accessory attachments. The keyed protuberance extends from the track and is configured to engage a keyway defined by a docking plate in order to secure the E-track system to the docking plate. The clamp extends from the track and is configured to engage an overhang of a truck bed side panel to secure the E-track system to the side panel.

A vehicle includes a cargo bed floor, a pair of side panels, docking plates, a pair of E-tracks, and clamps. The pair of side panels extend upward from the cargo bed floor. Each of the side panels has top surfaces, internal side surfaces, and overhangs extending from the top surfaces. The docking plates are secured to each of the internal side surfaces and define keyways. Keyed protuberances extend from each of the pair of E-tracks. The keyed protuberances engage the keyways and secure the E-tracks to the docking plates. The clamps extend from the E-tracks and engage the overhangs to secure E-tracks to the pair of side panels.

BRIEF DESCRIPTION OF THE DRAWINGS

FIG. 4 is a cross-section taken along line 4-4 in FIG. 3;

FIG. 5 is a cross-section taken along line 5-5 in FIG. 3; and

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Attaching E-track systems to trucks may require drilling holes and removing other material from the truck bed in order to properly secure an E-track system to the truck bed. Drilling holes and/or removing material from the sheet metal that the truck bed is made from may compromise the integrity of the truck bed structure. The E-track system disclosed herein includes a robust solution for attaching the E-track system to a pickup truck bed without drilling into the sheet metal structure of the bed. Furthermore, the system utilizes the strength of the truck bed side panels to provide support to for the E-track system.

Figure 1:
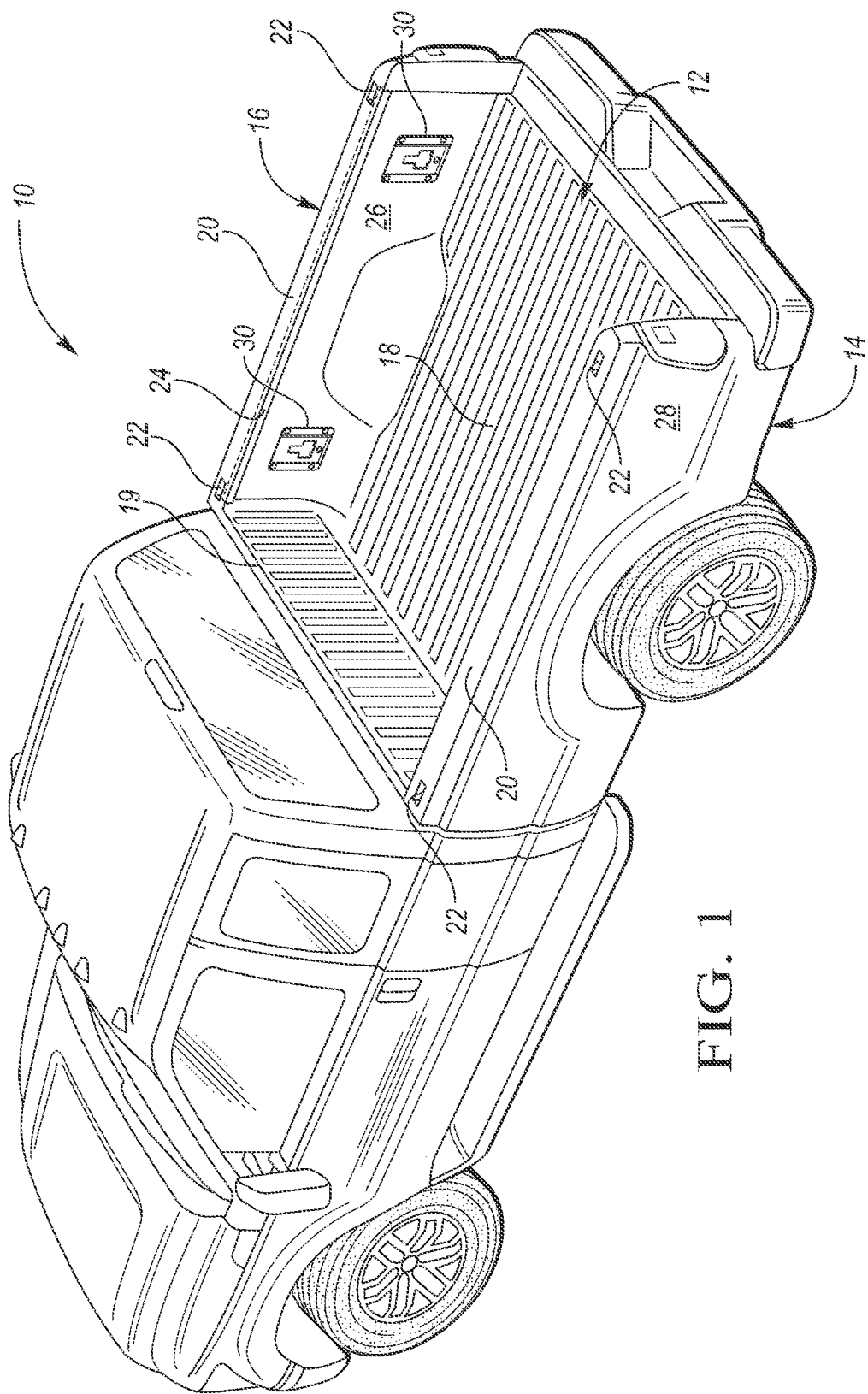
FIG. 1 is a perspective view of a vehicle having a cargo or truck bed.

Referring to FIG. 1, a vehicle 10 is illustrated. The vehicle 10 may be a truck that includes a cargo or truck bed 12. The truck bed 12 may include a first side panel 14 and a second side panel 16. The truck bed 12 may also include a truck bed floor 18 (which may also be referred to as a cargo bed floor), a headboard panel 19, and a tailgate (not shown). The first side panel 14 and second side panel 16 may extend upward from the truck bed floor 18. The components of the truck bed 12, including the first side panel 14, second side panel 16, floor 18, headboard panel 19, and tailgate, may be made from a sheet metal material, including but not limited to, steel sheet or an aluminum alloy sheet. The first side panel 14 and second side panel 16 may have top surfaces 20 that define stake pockets 22. The stake pockets 22 are through holes that extend through the top surfaces 20. Portions of the first side panel 14 and second side panel 16 (which may be referred as overhangs 24) may extend away and then downward from the top surfaces 20 of the first and second side panels, towards the truck bed floor 18. The first and second side panels 14, 16 include internal side surfaces 26 that face towards the interior of the truck bed 12 and external side surfaces 28 that face towards the exterior of the truck bed 12.

It may be desirable to tie down cargo at different locations within the cargo bed 12 during transit based on the size and shape of the particular cargo. A plurality of fixed plates 30 may be affixed at various location of the truck bed 12 to provide a number of different securing points for different cargo. In at least one embodiment, standard-sized fixed plates 30 are provided at several locations on one or more of the truck bed floor panel 18, first side panel 14, second side panel 16, truck bed floor 18, headboard panel 19, and tailgate. In alternative embodiments, the fixed plate 30 may be an elongate track having a number of different secure points along its length.

Figure 2:
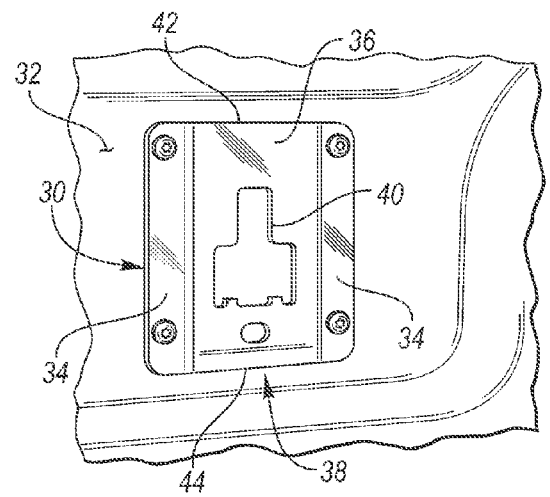
FIG. 2 is a perspective view of a standard interface plate.

Referring to FIG. 2, an example of a standard-sized fixed plate 30 is depicted. The standard-sized fixed plate 30 may alternatively be referred to as a docking plate. As discussed above, each of a number of fixed plates may define standard dimensions to accommodate modular connections using interchangeable components. In the example of FIG. 2, the fixed plate 30 is secured to a vertical wall 32, for example such as the internal side surfaces 26 of the first side panel 14 or second side panel 16. The fixed plate 30 includes a pair of opposing mounting flanges 34 that are secured to the vertical wall 32. An offset section 36 is provided between, and interconnects the opposing mounting flanges 34. The offset section 36 is positioned at a distance away from the vertical wall 32 to provide a gap 38. In this way, a number of different devices can be mechanically retained to the offset section 36 by extending into the gap 38 and engaging a back surface of the offset section 36. In one example, a hole (or keyway) 40 is provided near a center portion of the offset section. The hole 40 may be shaped to receive a locking feature from an interfacing component to retain to the fixed plate 30. In other examples, an interfacing component may be secured to an upper edge 42 and/or a lower edge 44 of the fixed plate 30.

Figure 3:
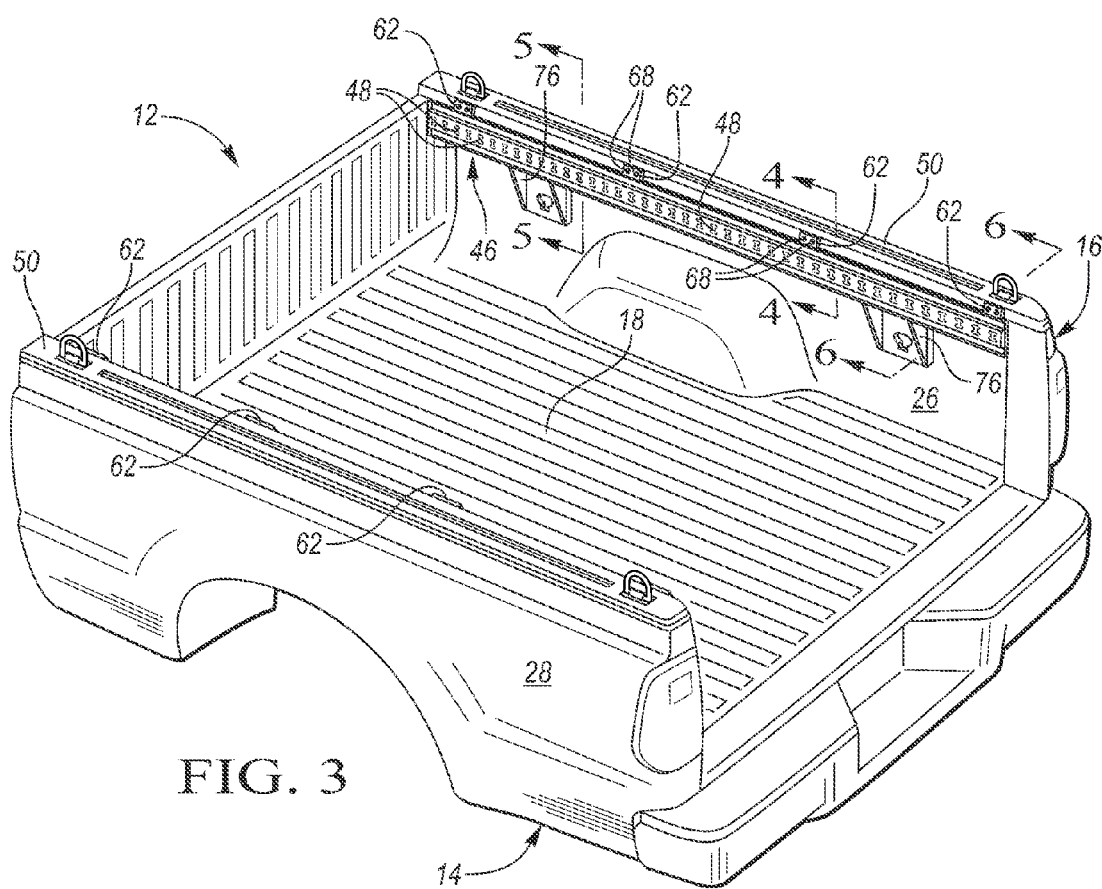
FIG. 3 is a perspective view of the truck bed having an E-track system secured thereto.

Referring to FIG. 3, the truck bed 12 is illustrated. E-track systems or simply E-tracks 46 may be secured to the first side panel 14 and second side panel 16. Specifically, the E-tracks 46 may be connected to the to the first side panel 14 and second side panel 16 via the fixed plates 30. The E-tracks 46 may consist of longitudinally extending tracks that define an array of slots 48 that are configured to receive and an array of E-track accessories. Among numerous others, the E-track accessories may include anchors, tie down rings, straps, rope tie-offs, and sockets configured to receive various objects (such as crossbeams). The various accessories may include or may be configured to receive straps, ropes, tie-downs, etc., in order secure a load that is disposed within the truck bed 12. The E-track accessories may include hooks or releasable latching mechanisms that engage the E-tracks 46 proximate to the array of slots 48 in order to secure various accessories to the E-track 46. At least one clamp may also be secured to the E-tracks 46. The clamps may protrude from the backside of the E-track 46 and are therefore not visible in FIG. 3. The clamps are depicted and described in further detail in FIG. 4. The clamps may also be configured to engage the first side panel 14 and second side panel 16 to secure the E-tracks 46 to the first side panel 14 and second side panel 16. Specifically, the clamps may be configured to secure the E-track 46 to the overhangs 24 of the first side panel 14 and second side panel 16. Side panel top covers 50 may also be secured to the first side panel 14 and second side panel 16. Specifically, the top covers 50 may be secured to the top surfaces 20 of the first side panel 14 and second side panel 16. The E-tracks 46 may further be secured to the top covers 50.

Referring to FIGS. 3 and 4, the truck bed 12 and a cross-section of the truck bed 12 taken along line 4-4 in FIG. 3 are illustrated. Clamps 52 extend from the E-track 46 and engage the second side panel 16 to secure the E-track 46 to the second side panel 16. The clamps 52 may be C-clamps. The clamps 52 may include clamping bolts 54 that engage an underside 56 of the overhang 24 to secure the E-track 46 to the second side panel 16. The clamping bolts 54 may be threaded into tapped holes 58 that are defined within the clamps 52. The clamping bolts 54 may also include the head portions 60 that engage the underside 56 of the overhang 24. The head portions 60 may be made from a soft plastic or rubber material. Tabs 62 that define apertures or through holes 64 may extend upward from the E-track 46. The top covers 50 may define tapped holes 66 that are configured to align with the through holes 64 defined by the tabs 62. The E-track 46 may be secured to the top cover 50 by fasteners 68 that pass through the through holes 64 and are threaded into the tapped holes 66. The through holes 64 may be countersunk holes and the fasteners 68 may be countersunk fasteners. Each tab 62 may have a corresponding and clamp 52 to provide local rigidity between the second side panel 16, E-track 46, and corresponding top cover 50.

The top covers 50 may define slots 70 that are configured to receive a tonneau cover. The tonneau cover may be secured to a pair of top covers 50 by engaging the slots 70 in the pair of top covers 50. The tonneau cover may include hooks, clasps, catches, or other mechanisms that engage the slots 70. The top covers 50 may also define T-slots 72 that are configured to receive T-nuts in order to mount a variety of accessories to the top covers 50.

Referring to FIGS. 3 and 5, the truck bed 12 and a cross-section of the truck bed 12 taken along line 5-5 in FIG. 3 is illustrated. Keyed protrusions or keyed protuberances 74 may extend from the E-track 46 and engage the holes (or keyways) 40 in the fixed plates 30 to secure the E-track 46 to the fixed plates 30 and the second side panel 16. The keyed protuberances 74 may be affixed to and extend from gussets 76 that extend from the E-track 46, below the overhang 24, and towards the internal side surface 26 of the second side panel 16. The keyed protuberances 74 may include latches 78 that engage the fixed plates 30 proximate to the holes 40 in order to secure the keyed protuberances 74 to the fixed plates 30. The latches 78 may include actuators 80 that transition the latches 78 between engaged positions 82 and disengaged positions 84. The actuators 80 may be levers, push buttons, or some other mechanism that is capable of transitioning a latch 78 between the engaged position 82 and the disengaged position 84 to facilitate installation or removal of the E-track 46 to the fixed plates 30. While in the engaged positons 82, the latches 78 engage back surfaces 86 of the offset sections 36 of the fixed plates 30 to prevent the keyed protuberances from slipping out of the holes 40. Other mechanisms, such as ratchets, biasing elements, levers, and pivoting components may be utilized to transition the latches 78 between the engaged positions 82 and the disengaged positions 84. In the alternative, the latches 78 may engage the back surfaces 86 of the offset sections 36 of the fixed plates 30 proximate to the upper edges 42 and/or the lower edges 44.

Figure 6:
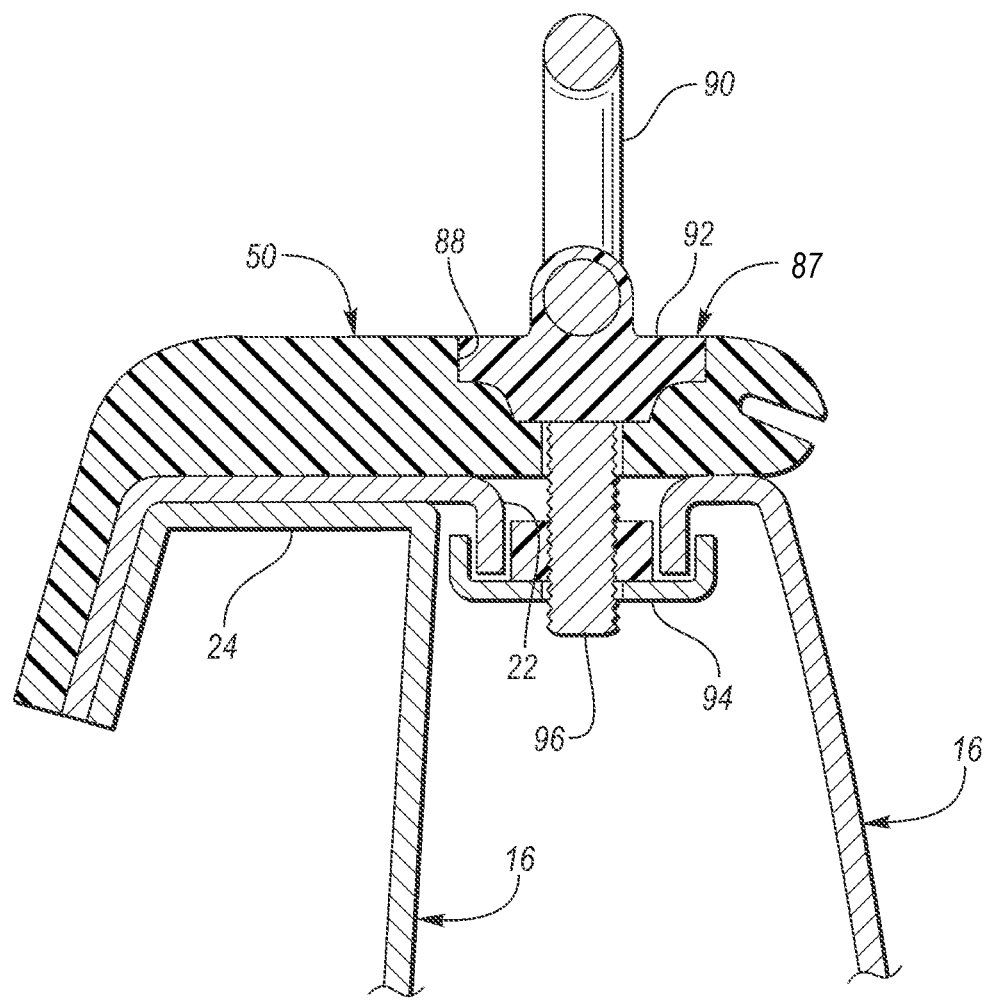
FIG. 6 is a cross-section taken along line 6-6 in FIG. 3.

Referring now to FIGS. 2 and 6, the truck bed 12 and a cross-section of the truck bed 12 taken along line 6-6 in FIG. 3 are illustrated. Plugs 87 may be received within the stake pockets 22 and apertures (or receptacles) 88 defined by the top covers 50, when the take pockets 22 and apertures are in alignment, to prevent the top covers 50 from slipping relative to the first side panel 14 and second side panel 16. The plugs 87 may include bullrings 90 that are configured to receive straps, ropes, tie-downs, etc., to secure a load that is disposed within the truck bed 12. The plugs 87 may or may not include accessories such as bullrings 90. The plugs 87 may include top portions 92 that are disposed within and engage the apertures 88 in the top covers 50 and bottom portions 94 that are disposed within and engage the stake pockets 22 in the side panels. The top portions 92 and bottom portions 94 of the plugs 87 may be secured to each other by one or more fasteners 96. One of the top portion 92 and bottom portion 94 of the plugs 87 may have a through hole while the other has a tapped hole. The through hole may be a countersunk hole and the fastener 96 may be a countersunk fastener.

The E-track system and the corresponding components (e.g., clamps 52, tabs 62, gussets 76, keyed protuberances 74, latches 78, et al.) were described above mainly with respect to the second side panel 16. However, it should be understood that an E-track system, including some or all of the components described above, could also be secured to the first side panel 14 in the same manner. It should be further understood, that the E-track system that is secured to the first side panel 14 is a mirror image of the E-track system secured to the second side panel 16.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a truck bed side panel having a top surface, a side surface, and an overhang extending from the top surface;
   a docking plate secured to the side surface and defining a keyway;
   an E-track having a keyed protuberance extending therefrom, the protuberance engaging the keyway and securing the E-track to the docking plate; and
   a clamp extending from the E-track and engaging the overhang to secure the E-track to the side panel.

2. The vehicle of claim 1, wherein the protuberance includes a latch that engages the docking plate proximate to the keyway to secure the protuberance to the docking plate.

3. The vehicle of claim 2, wherein the latch includes an actuator that transitions the latch between engaged and disengaged positions to facilitate installation of the E-track to the docking plate.

4. The vehicle of claim 1, wherein the keyed protuberance is secured to a gusset that extends from the E-track, below the overhang, and towards the side surface of the side panel.

5. The vehicle of claim 1, further comprising a top cover secured to the top surface of the side panel and wherein the E-track is secured to the top cover via fasteners passing through apertures defined by the E-track and threaded into tapped holes defined by the top cover.

6. The vehicle of claim 5, wherein the side panel defines a stake pocket, the top cover defines a receptacle that is in alignment with the stake pocket, and a plug is disposed within the stake pocket and receptacle to prevent slippage of the top cover.

7. The vehicle of claim 1, wherein the clamp includes a clamping bolt engaging an underside of the overhang to secure the E-track to the side panel.

8. A vehicle comprising:
   a cargo bed floor;
   a pair of side panels extending upward from the floor, each of the side panels having a top surface, an internal side surface, and an overhang extending from the respective top surface;
   docking plates secured to each of the internal side surfaces and defining keyways;
   a pair of E-tracks having keyed protuberances extending therefrom, the protuberances engaging the keyways and securing the E-tracks to the docking plates; and
   clamps extending from the E-tracks and engaging the overhangs to secure E-tracks to the pair of side panels.

9. The vehicle of claim 8, wherein the protuberances include latches that engage the docking plates proximate to the keyways to secure the protuberances to the docking plates.

10. The vehicle of claim 9, wherein the latches include actuators that transition the latches between engaged and disengaged positions to facilitate installation of the E-tracks onto the docking plates.

11. The vehicle of claim 8, wherein the keyed protuberances are secured to gussets that extend from the E-tracks, below the overhangs, and toward the side surfaces of the side panels.

12. The vehicle of claim 8, further comprising top covers that are secured to the top surfaces of the side panels and wherein the E-tracks are secured to the top covers via fasteners passing through apertures defined by the E-tracks and threaded into tapped holes defined by the top covers.

13. The vehicle of claim 12, wherein the side panels define stake pockets, the top covers define receptacles that are in alignment with the stake pockets, and plugs are disposed within the stake pockets and receptacles to prevent slippage of the top covers.

14. The vehicle of claim 8, wherein the clamps include clamping bolts engaging undersides of the overhangs to secure the E-tracks to the side panels.

\* \* \* \* \*